Feb. 6, 1923.

C. A. WEFING

OIL SEAL AND PISTON RING FOR INTERNAL COMBUSTION ENGINES

Filed Oct. 29, 1921

Inventor
Charles A. Wefing.

Patented Feb. 6, 1923.

1,444,407

UNITED STATES PATENT OFFICE.

CHARLES A. WEFING, OF EDGEWATER, COLORADO.

OIL SEAL AND PISTON RING FOR INTERNAL-COMBUSTION ENGINES.

Application filed October 29, 1921. Serial No. 511,231.

*To all whom it may concern:*

Be it known that I, CHARLES A. WEFING, a citizen of the United States, residing at Edgewater, county of Jefferson, and State of Colorado, have invented certain new and useful Improvements in Oil Seals and Piston Rings for Internal-Combustion Engines; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to internal combustion engines and has special reference to the piston and piston rings.

It is the object of this invention to provide an effective, simple and practicable means for preventing an undue amount of lubricating oil from entering the space above the piston. It is well known that carbon troubles are due mostly to the fact that lubricating oil enters the combustion chamber where it becomes carbonized by the intense heat of the exploding gases. In order to prevent an undue amount of lubricating oil from being carried into the combustion chamber, various devices have been proposed and tried, with a varying degree of success, most of which, however, fall short of the requirements.

I have found that the greatest proportion of the oil which enters the combustion chamber does not enter between the cylinder walls and the piston ring surface, as is popularly supposed, but passes between the piston ring and the surfaces of the piston groove. It has, therefore, been my object to provide means which will prevent oil from passing from one side to the other of the piston ring between it and the cylinder surface, and also to provide means for preventing the oil from passing between the surfaces of the groove in the piston and the piston, and in addition to this I have provided a path through which the oil can readily be returned to the crank casing.

In order to more clearly describe my invention, I shall have reference to the accompanying drawing, in which Fig. 1 is a side view of a piston equipped with one of my improved rings and oil seal, part being broken away to show my ring and oil seal in their proper relative relation.

The same reference numbers will be used to indicate the same parts throughout the several views.

Figure 1:
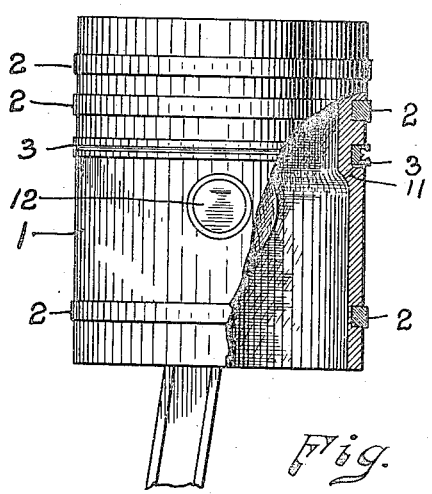
Figure 2:
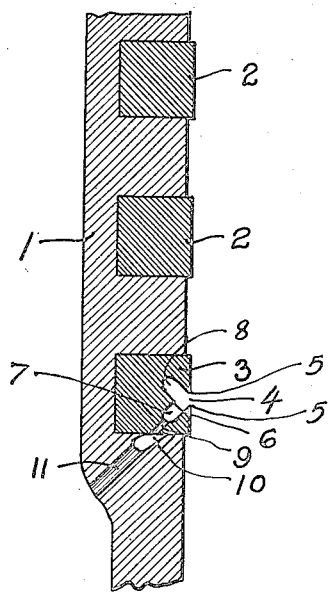
Fig. 2 is a section similar to the section shown in Fig. 1, but to a larger scale.
Figure 3:
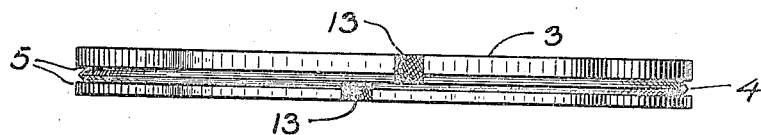
Fig. 3 is a side elevation of my improved ring.

Numeral 1 represents an ordinary internal combustion engine piston, which is provided with four piston grooves for the reception of piston rings. Three of the rings which are indicated by numeral 2 are of the ordinary type, whereas the fourth one, indicated by the numeral 3, is of the improved type made in accordance with this invention. My improved ring is similar in size and general appearance to the ordinary piston ring, and has preferably a stepped slip joint of the type shown in Fig. 4. My ring is made in one part and has a groove 4 in its outer surface; this groove has a cross section which resembles the numeral 3 or a reversed numeral 3 when seen from the direction in which it is seen in Fig. 2. By means of the groove 4, the ring 3 is provided on its outer surface with a pair of opposed edges 5 and a central projecting rib 6, which divides the groove into two pockets 7 and 8. As the piston ring is reciprocated in contact with the cylinder walls, it is evident that edges 5 will scrape the oil from the cylinder walls and deposit the same in pockets 7 or 8. It is evident that unless means were provided whereby the oil could readily escape from the interior of groove 4, it would soon fill up with oil and lose its effectiveness. I have therefore provided a plurality of spaced holes 9 from the bottom of pocket 7 to the under side of the ring. In order to prevent oil from passing from the lower side of the ring 3 to the upper side between the sides of the ring surfaces and the surfaces of the groove, I cut a channel 10 in the lower surface of the groove (Fig. 2), and between the bottom of the channel and the inside of the piston I provide a plurality of spaced openings 11. It is evident that any oil that may enter between the lower side of the piston ring 3 and the groove will flow into channel 10 and through holes 11 into the interior of the piston, from whence it will automatically find its way to the crank case. In a similar manner the oil that is scraped from the cylinder surface by edges 5 will flow through holes 9 into channel 10, and from thence through holes 11 into the interior of the piston.

I preferably locate my oil seal directly above the wrist pin bearing 12, as oil will always find its way between the wrist pin and its bearing to the cylinder walls, and for this reason it is essential that the oil seal be located above this point. Where the piston is provided with several rings above the wrist pin bearing, I preferably employ the groove directly above the wrist pin bearing for my oil seal, although it can be employed with any of the other grooves, if desired; but the lower one is preferable on account of the greater ease with which I am able to drill the holes 11 without endangering the structure of the other grooves, as would be the case if I employed any of the others.

Figure 4:
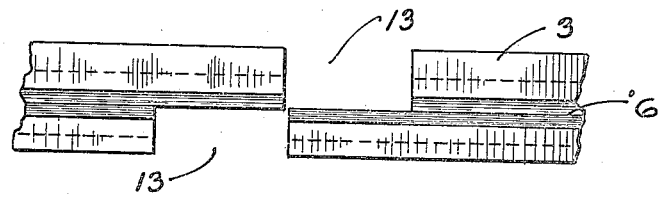
Fig. 4 is a fragmentary view of the joint in the ring shown to a larger scale.

The rib 6 is located, preferably, midway between the upper and lower surface of the ring and forms the line of the parallel surfaces of the joint, in the manner shown in Fig. 4, which shows the ends of the ring as being provided with stepped portions or notches 13.

From the above, it will be seen that I have provided a simple and effective oil seal which can be applied to any piston of ordinary construction; that my seal employs a single piece piston ring that is substantial and simple in its construction, and which can be easily and cheaply made; my seal does not depend on the ring exclusively for its effect, but on the cooperation therewith of the channel 10 in the piston groove and the means which I have provided in connection therewith to permit the oil to return to the crank casing.

Having now described my invention, what I claim as new is:

1. In an internal combustion engine having a cylinder, a hollow piston, and means for reciprocating said piston, means for preventing the passage of oil between said cylinder and said piston, said means comprising a rectangular groove in the piston surface, a channel in one side of said groove, holes from said channel to the interior of said piston, a piston ring in said groove, a groove in the outer surface of said ring, said groove being wider at its bottom than at its outer side, whereby two edges having inclined sides are formed, and openings from the lower side of said groove to the lower surface of said ring, whereby the oil which enters the last named groove may flow into said channel.

2. A piston ring having a groove in its outer periphery, said groove being wider within the ring than at its surface, a projecting rib in the bottom of said groove, and holes from one side of said ring into said groove.

3. A piston ring having a groove in its outer surface, said groove having inclined sides and a central projecting rib.

4. A piston ring having a groove in its outer surface, said groove being wider within the ring than at the surface, a central projecting rib in the bottom of said groove, and holes from the side of said ring into said groove.

In testimony whereof I affix my signature.

CHARLES A. WEFING.